United States Patent Office 3,651,128
Patented Mar. 21, 1972

3,651,128
BACTERIOSTATIC CARBAMATES OF BISPHENOLS
Edward J. Nikawitz, Glen Rock, N.J., assignor to
Givaudan Corporation, Clifton, N.J.
No Drawing. Filed June 11, 1968, Ser. No. 736,008
Int. Cl. C07c 125/06
U.S. Cl. 260—479 C
7 Claims

ABSTRACT OF THE DISCLOSURE

This disclosure relates to certain carbamates of halogenated bisphenols. These esters have been found to have useful and unexpected properties making them suitable for employment as anti-bacterial agents in a wide variety of compositions, including toilet soaps.

SUMMARY OF THE INVENTION

This invention relates to a novel class of carbamic acid esters of certain bisphenols.

The novel compounds of this invention have the formula:

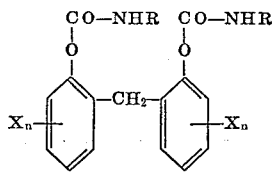

wherein R is a member selected from the group consisting of a lower alkyl radical and a lower alkenyl radical, X is halogen and $n$ is an integer from 2 to 3, provided that when $n$ is 2, then R is methyl.

The carbamates of this invention can be prepared by reacting a bisphenol having the formula:

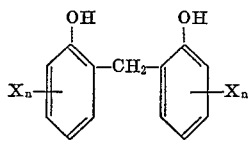

with an isocyanate having the formula, RNCO, wherein R, X and $n$ have the same significance as above.

The novel compounds can be used as anti-bacterial agents in a wide variety of compositions.

DETAILED DESCRIPTION OF THE INVENTION

Bacteriostatic bisphenols are widely used as active ingredients of deodorant soaps. For many years these soaps have proved effective, useful and safe. However, these bisphenol-containing soaps have a strong tendency to discolor under the influence of light. This is an objectionable feature of these otherwise excellent compounds.

The novel compounds of the present invention show a surprising and unexpected combination of properties. They display strong antibacterial activity in combination with little or no tendency to discolor under the influence of light, when incorporated into soap. In addition, the new compounds exhibit a much lower degree of oral toxicity than the bis-phenols commonly used.

It has also been found that the novel compounds of this invention may be used as anti-bacterial agents by themselves or along with a wide variety of capillary or surface-active materials besides soap. Such materials include salts of sulfated alcohols such as sodium lauryl sulfate, for example; salts of sulfated and sulfonated alkyl acids amides ("Igepon T"); salts of alkylaryl sulfonates, e.g. sodium dodecylbenzene sulfonate; alkylnaphthalenesulfonic acids and their salts ("Nekal"); salts of sulfonated alkylaryl polyether alcohols (Triton 720); and many other products, detergents and emulsifiers known to the art whether of the anionic, cationic, nonionic or amphoteric types of surface active agents. A more complete description of many of the materials included in the class of capillary active and surface active agents referred to above may be found in Encyclopedia of Surface-Active Agents, I. P. Sisley, Chemical Publishing Co., Inc., New York, N.Y., and Surface Active Agents, A. M. Schwartz and I. W. Perry, Interscience Publishers, Inc., New York, N.Y.

As is well known, many of the available bacteriostatic agents, notably those of the quaternary ammonium salt type, are inactivated in the presence of capillary-active or surface active agents such as soaps and detergents. The bacteriostatic activity of the agents of the present invention, however, as a general rule, is not substantially reduced by a wide variety of surface-active substances, and in some cases is even improved. For this reason, the new agents are especially useful in combination with such capillary-active materials.

As other examples of particular applications of the novel compounds of this invention, their use with dry powdered carriers such as starch or talcum, with or without other medicants, is noted. Incorporation into pressed solids may also be effected, if desired. Solutions of the novel compounds of this invention in suitable solvents may be incorporated into cosmetic compositions in stick, paste, jelly, cream, lotion, roll-on, spray aerosol or other forms. The compounds of this invention can also be finely milled and incorporated into ointments by conventional techniques to render the ointments antibacterial. In addition, solutions or dispersions of the novel compounds may be also used for cleaning medical instruments, food processing equipment, or any other surface upon which it is desired to control bacteria.

Relatively small amounts of the new bacteriostatic compounds may be used in the antibacterial compositions described above, including soaps and other surface-active or detergent compositions, which may be considered to be typical as to concentration levels. Amounts as low as 0.1% to 1%, based upon the total weight of the composition may be employed although a range of about 1 to 3% is usually preferred. Amounts less than about 0.1% are generally of little value since they generally do not produce a useful degree of activity. Although 5% or more may be used, the upper limit of the amount of agent which may be used is determined by practical considerations. As a general rule, increasing the concentration of agent in the composition increases the germicidal activity of the resulting product. However, the cost of the agent relative to the cost of the product itself mitigates against the use of too large an amount of the agent. Moreover, large amounts of the agent are to be avoided if such use would adversely affect the properties of the product.

With respect to soap, the invention may be practiced by adding the agents to the soap in any suitable manner during the crutching or milling or similar operation. Care should be taken to obtain a uniform distribution of the agent throughout the soap. They may be dissolved in a small amount of a suitable solvent or may be dispersed or wetted with a suitable dispersing or wetting agent before incorporation into soap. In general, any method which results in the agent being uniformly incorporated into the final soap product is satisfactory.

The new bacteriostatic compounds, as noted above, can also be incorporated in similar concentrations in cosmetic formulations and detergent compositions other than soaps, according to known techniques fully familiar to those skilled in the art.

A similar range of total concentration of bacteriostats can also be employed for mixtures of the new compounds with other bacteriostats, as for instance, bacteriostatic phenols, bisphenols, carbanilides, salicylanilides or any other bacteriostat or bactericide.

In general, the novel compounds of this invention are prepared by reacting the appropriate bisphenol and isocyanate in the presence of catalytic amounts of tertiary amines, such as triethylamine, dimethylaniline and pyridine. The molar ratio of bisphenol to isocyanate is 1:2. It has been found advisable to use a slight excess of isocyanate, usually 5 to 10 percent, although a larger excess may be employed, if desired.

The reaction is preferably conducted in the presence of solvents or diluents which are inert to isocyanates. Examples of such solvents include acetone, acetonitrile, benzene, toluene, ethylene dichloride and ethers. The reaction can be carried out at room temperature (cooling can be applied since the reaction is exothermic in many cases), or at the boiling point of the employed solvent or diluent, or at any temperature between the aforesaid limits.

If desired, the reaction may be carried out in a closed system, at elevated temperatures and superatmospheric pressures.

The novel compounds, in general, are crystalline, white products and can be removed from the reaction mixture by filtration. Depending on the amount of solvent (diluent) used for the reaction and on the solubility of the end product, it may be in some cases advisable to cool before filtration or to add additional diluents in which the carbamates are insoluble and then to proceed with the filtration. It is understood that the choice of the precipitating diluents depends on the kind of the reaction solvent used. Water can, for instance, be used in the case of water-miscible solvents, while hexane or heptane are very suitable addends for benzene, toluene, or ethylene dichloride.

The novel compounds are, as a rule, obtained as products of fair purity and can be used as obtained. However, if very pure products are required, purification can be carried out by crystallization from suitable solvents, as for instance alcohols, toluene, xylenes, ketones or mixtures of these solvents.

At room temperature, the novel compounds are, in general, difficultly-soluble in most organic solvents with the exception of dimethylformamide and dimethylsulfoxide which are good solubilizers.

In order to test the anti-bacterial properties of the compounds of this invention, they were tested in soap, for illustrative purposes. The in vitro soap bacteriostatic tests were conducted as follows: A compound is dissolved in a suitable solvent, usually dimethylformamide, to give a 6% solution. One-half ml. aliquot was added to 100 ml. of 3% solution of bar soap stock solution. The solid soap used was a neutral white toilet soap of the "Lux" type. The fatty acids in this soap were of the following composition:

| | Percent |
|---|---|
| Oleic and Linoleic acids | About 45 |
| Palmitic acid | About 10 |
| Lower fatty acids (lauric, etc.) | About 15 |
| Stearic acid | About 10 |

This yields an aqueous soap solution containing 30,000 mcg./ml. soap and 300 mcg./ml. compound. The soap/compound ratio in the latter is 100/1. A two-fold serial dilution series is prepared with this solution using sterile distilled water in test tubes such that the final volume in each tube is 2.0 ml. To each test tube is added 28 ml. of molten Dextrose Trypticase Extract Agar (B.B.L.). The tube contents were poured into sterile Petri plates and allowed to harden. The highest final concentration of compound in the serial dilution series is 20 mcg./ml. Plates were spot innoculated with a broth culture of Staphylococcus aureus and incubated at 35° for 48 hours. The lowest concentration completely inhibiting growth of the test organism, in mcg./ml., is recorded as the bacteriostatic concentration of the compound. Tests in the absence of soap are made in a similar manner except that all dilutions are made in solvent. The final concentration in the agar should not be greater than 5%.

The results of these tests with the novel compounds as compared with two known antibacterials are set forth in Table I. Column 1 contains the data as to the activity of the test solution without soap; column 2 refers to tests in which the ratio of soap to compound is 100:1. In both cases the numbers mean minimum concentration range (mcg./ml.) where S. aureus growth is completely inhibited.

TABLE I

| Compound | Col. 1 | Col. 2 |
|---|---|---|
| 2,2'-methylenebis (4,6-dichlorophenol), di-(N-methyl carbamate) | 1.25–0.625 | 1.25–0.625 |
| 2,2'-methylenebis (3,4,6-trichlorophenol), di(N-methyl carbamate) | 1.25–0.625 | 0.625–0.312 |
| 2,2'-methylenebis (3,4,6-trichlorophenol), di(N-ethylcarbamate) | 1.25–0.625 | 0.625–0.312 |
| 2,2'-methylenebis (3,4,6-trichlorophenol), di(N-propylcarbamate) | 1.25–0.625 | 0.625–0.312 |
| 2,2'-methylenebis (3,4,6-trichlorophenol), di(N-butylcarbamate) | 1.25–0.625 | 1.25–0.625 |
| 2,2'-methylenebis (3,4,6-trichlorophenol), di(N-allylcarbamate) | 1.25–0.625 | 0.625–0.312 |
| 2,2'-methylenebis (4,6-dichlorophenol) | 0.78–0.39 | 1.56–0.78 |
| 2,2'-methylenebis (3,4,6-trichlorophenol) (hexachlorophene) | 0.39–0.19 | 1.56–0.78 |

In connection with the foregoing tabulated data, it is of interest to note that when certain substances, closely-related, chemically, to the novel compounds of this invention, were tested in similar manner, such substances were found to be inactive. Such substances included carbamate esters of 2,2'-methylenebis (4,6-dichlorophenol) other than the methyl ester; the cyclohexyl N-carbamate of 2,2'-methylenebis (3,4,6-trichlorophenol); and the carbamates of 2,2'-methylenebis (4-chlorophenol).

The advantageous color properties of the novel compounds of this invention when incorporated in soap bars are shown by the following-described test and results.

Bars containing about 2 percent of the novel compound were prepared from 30 g. of soap chips (Lever Brothers stock), 0.7 g. of compound and 4 ml. of water, by mixing the ingredients intimately for several times in a mortar. The resulting mass was pressed into bars. The bars were exposed to daylight (sunny days prevailed most of the time), and the color changes were evaluated visually, using the following classification of discoloration. Samples containing one percent of 2,2'-methylenebis (4,6-dichlorophenol) and 2,2'-methylenebis (3,4,6-trichlorophenol) and a blank soap were also evaluated for comparison.

Classification of discoloration

Color scale:

(1) White
(2) Nearly white
(3) Slightly off-white
(4) Distinctly off-white
(5) Off-white with tan tinge
(6) Slightly brown
(7) Distinctly brown
(8) Dark brown
(9) Very dark brown
(10) Dark brown—worse than 9.

The results are given in Table II.

TABLE II

| Compound | After 1 hr. | After 2½ hrs. | After 5 hrs. | After 8 hrs. | After 23 hrs.[1] | After 28 hrs.[1] | After 4 days [1] | After 5 days [1] | After 18 days [1] |
|---|---|---|---|---|---|---|---|---|---|
| 1% 2,2'-methylenebis (4,6-dichlorophenol) | 6 | 7 | 8 | 8 | 8 | 9 | 10 | 10 | 10 |
| 2% 2,2'-methylenebis (4,6-dichlorophenol) | 6 | 7 | 8 | 8 | 8 | 9 | 10 | 10 | 10 |
| 1% 2,2'-methylenebis (3,4,6-trichlorophenol) | 6 | 7 | 8 | 8 | 8 | 9 | 10 | 10 | 10 |
| 2% 2,2'-methylenebis (3,4,6-trichlorophenol) | 6 | 7 | 8 | 8 | 8 | 9 | 10 | 10 | 10 |
| Bis N-methylcarbamate of 2,2'-methylenebis (4,6-dichlorophenol) | 1 | 2 | 3 | 4 | 4 | 5 | 5 | 5 | 5 |
| Bis N-ethylcarbamate of 2,2'-methylenebis (3,4,6-trichlorophenol) | 1 | 2 | 2 | 3 | 3 | 4 | 4 | 4 | 5 |
| Bis N-methylcarbamate of 2,2'-methylenebis (3,4,6-trichlorophenol) | 1 | 1 | 2 | 3 | 3 | 4 | 4 | 4 | 5 |
| Bis N-allylcarbamate of 2,2'-methylenebis (3,4,6-trichlorophenol) | 1 | 1 | 2 | 4 | 4 | 4 | 4 | 4 | 4 |
| Bis N-propylcarbamate of 2,2'-methylenebis (3,4,6-trichlorophenol) | 1 | 1 | 1 | 1, 2 | 2 | 2 | 2 | 2 | 2 |
| Bis N-butylcarbamate of 2,2'-methylenebis (3,4,6-trichlorophenol) | 1 | 1 | 1 | 1, 2 | 2 | 2 | 2 | 2 | 2 |
| Blank | 1 | 1 | 1 | 1 | 1 | 1 | 1 | 1 | 2 |

[1] Night included.

It is noteworthy that 2,2'-methylenebis (4,6-dichlorophenol) and 2,2' - methylenebis (3,4,6-trichlorophenol) discolor badly in soap whereas the compounds of this invention remain nearly white or off-white. It is also interesting that the carbamates of two known antibacterial phenols, 2,2'-thiobis-(4,6-dichlorophenol), and 2-hydroxy-4-chlorophenol 2',4'-dichlorophenyl ether, discolor in soap as badly as 2,2'-methylenebis (4,6-dichlorophenol) or 2,2'-methylenebis (3,4,6-trichlorophenol).

In respect to toxicity, the new compounds constitute a definite and unexpected progress over known bisphenols. The oral $LD_{50}$ in rats is:

2,2'-methylenebis (3,4,6-trichlorophenol): 161 mg./kg.
2,2'-methylenebis (3,4,6-trichlorophenol), di(N-methylcarbamate): >13 g./kg.
2,2'-methylenebis (4,6-dichlorophenol), di(N-methylcarbamate): >13 g./kg.

Two typical soap formulations showing the use of the novel compounds of this invention in soap follow:

(A) Two parts of finely ground, novel compound are blended well with 98 parts of soda soap filings. The blend is then milled thoroughly and pressed into molds. The soda soap may be of the "Lux" type described above or any other suitable bar soap stock.

(B) One part of any one of the finely ground bacteriostatic compounds of this invention is carefully blended with one part of 3,4,4'-trichlorocarbanilide or with one part of hexachlorophene or with one part of a mixture of dibromosalicylanilide, or one part of tribromosalicylanilide, or one part of a mixture of the latter two (Diaphene). This mixture is intimately milled with 98 parts of soda soap filings as above and pressed into molds.

The mixture of the bacteriostats can also be first blended with one to two parts of sodium laurylsulfate, or "Igepon T," or "Triton 720," and the resulting mixture is then intimately milled with 97–96 parts of soda soap.

The dispersing or wetting agents are, in another modification of procedure, first dissolved or emulsified in a small amount of water, acetone, alcohol, etc. and then blended with the bacteriostats of this invention or their combinations with other bacteriostats, prior to incorporation into soap.

The invention will be further exemplified by the following examples, which are intended as illustrations and not as limitations of the invention. Unless otherwise stated herein, the temperatures are in degrees centigrade and all parts are by weight.

Examples 1 to 6, inclusive, illustrate the preparation of the novel compounds of this invention and Examples 7 to 12, inclusive, illustrate formulations utilizing the novel compounds.

EXAMPLE I

Preparation of 2,2'-methylenebis(3,4,6-trichlorophenol) di(N-methylcarbamate)

(1) 2,2'-methylenebis (3,4,6-trichlorophenol), (20 g.) and dry toluene (400 ml.) were charged into a 1.1 flask fitted with a sealed stirrer, a thermometer, a dropping funnel and a reflux condenser with drying tube.

Triethylamine (1 ml.) and methyl isocyanate (8.5 ml.) were added to the agitated suspension. The temperature rose from 25° to 30°. A solution formed first and then a new precipitate appeared.

The batch was agitated 16 hours at room temperature and 5 hours at reflux. After cooling to room temperature, the formed solid was filtered, washed with a little toluene and dried. Yield: 19.6 g.; M.P. 200–205°.

It was recrystallized from toluene (350 ml.) Yield: 18.6 g.: after drying at 95° at a pressure of 4 mm.; M.P. 207–209° (decomposition).

*Analysis.*—Calcd. for $C_{17}H_{12}Cl_6N_2O_4$ (percent): C, 39.19; H, 2.33; Cl, 40.83; N, 5.38. Found (percent): C, 39.95; H, 2.35; Cl, 40.47; N, 4.97.

(2) 2,2'-methylenebis (3,4,6 - trichlorophenol), (40.7 g.), dry acetone (150 ml.), triethylamine (1 ml.) and methyl isocyanate (14 ml.) were brought to reaction in a suitable vessel. (See part (1) of this example.)

After mixing the components, the temperature rose spontaneously to 45° and a heavy precipitate formed. The batch was then agitated 2 hours at room temperature and 3 hours at reflux (temperature 58–59°). Hexane (200 ml.) was added and the whole was agitated overnight at room temperature. After cooling for one hour at −10°, the solid was filtered, washed with ice-cold hexane and dried. Yield: 48.3 g.; M.P. 206–208° (decomposition).

*Analysis.*—Calcd. for $C_{17}H_{12}Cl_6N_2O_4$ (percent): Cl, 40.83; N, 5.38. Found (percent): Cl, 40.74; N, 5.32.

EXAMPLE 2

Preparation of 2,2'-methylenebis (4,6-dichlorophenol) di(N-methylcarbamate)

(1) 2,2'-methylenebis (4,6-dichlorophenol) (33.8 g.), dry toluene (400 ml.), triethylamine (1 ml.) and methyl isocyanate (16 ml.) were brought to reaction in a suitable vessel. (See part (1) of Example 1.)

The batch was agitated for 2 hours; a heavy precipitate formed; toluene (200 ml.) was added and the whole was refluxed for 5 minutes. After standing for 20 hours the batch was cooled at −10° for one hour. The white solid was filtered, washed with ice-cold toluene and dried in a dish. Yield: 43 g.; M.P. sintering at 220°, melting at 236–238°.

It was recrystallized from a mixture of alcohol (800 ml.) and acetone (100 ml.). Yield: 17.5 g.; M.P. 240–243° (decomposition) after sintering.

*Analysis.*—Calcd. for $C_{17}H_{14}Cl_4N_2O_4$ (percent): N, 6.20. Found (percent): N, 6.08.

(2) 2,2'-methylenebis (4,6-dichlorophenol) (33.8 g.), dry acetone (100 ml.), triethylamine (0.5 ml.) and methyl isocyanate (14 ml.) were brought to reaction in a suitable vessel. (See part (1) of Example 1.)

The temperature rose to 50° and a cake formed. Acetone (50 ml.) was added to facilitate agitation. After agitation for 3 hours at room temperature, agitation which was diffcult, was continued for one hour at reflux. Hexane (200 ml.) was added and after agitation for 10 hours, the white precipitate was filtered, washed with ice-cold hexane and dried. Yield: 42 g.; M.P.: 233–235° (decomposition).

*Analysis.*—Calcd. for $C_{17}H_{14}Cl_4N_2O_4$ (percent): Cl, 31.37; N, 6.20. Found (percent): Cl, 31.58; N, 5.94.

EXAMPLE 3

Preparation of 2,2'-methylenebis (3,4,6-trichlorophenol), di(N-allylcarbamate)

2,2'-methylenebis (3,4,6-trichlorophenol) (40.7 g.) in acetone (300 ml.), triethylamine (0.5 ml.) and allyl isocyanate (22 ml.) were brought to reaction for 4 hours at room temperature and 2 hours at reflux. Hexane (300 ml.) was added and the batch was cooled for one hour in ice/methanol. The solid was filtered, washed with toluene and dried. Yield: 41.8 g.; M.P. 190–191°; color: white.

*Analysis.*—Calcd. for $C_{21}H_{16}Cl_6N_2O_4$ (percent): N, 4.9. Found (percent): N, 5.1.

EXAMPLE 4

Preparation of 2,2'-methylenebis (3,4,6-trichlorophenol), di(N-propylcarbamate)

2,2'-methylenebis (3,4,6 - trichlorophenol) (40.7 g.), toluene (300 ml.), triethylamine (1 ml.) and propyl isocyanate (24 ml.) in toluene (50 ml.) were brought initially to reaction as described in Example 1. Then, the agitated batch was heated at 60° for 5 hours, agitated at room temperature for 18 hours and finally at reflux for 4 hours. After cooling to room temperature, petroleum ether (250 ml.) was added and the batch was agitated for one hour at −10°.

The formed solid was filtered, washed with ice-cold toluene and dried. Yield: 15.8 g.; M.P. 195–198°. It was recrystallized from 225 ml. of ethylene dichloride. Yield: 12.8 g.; M.P. 202–204°.

*Analysis.*—Calcd. for $C_{21}H_{20}Cl_6N_2O_4$ (percent): N, 4.85. Found (percent): N, 4.71.

EXAMPLE 5

Preparation of 2,2'-methylenebis (3,4,6-trichlorophenol), di(N-ethylcarbamate)

Hexachlorophene (40.7 g.) in dry acetone (250 ml.), triethylamine (1 ml.) and ethyl isocyanate (19 ml.) were brought to reaction in a suitable vessel according to the procedure described previously.

After agitation for 2 hours at room temperature (following the initial exothermic reaction) and a two hour reflux period, the batch was cooled for one hour at −10°. The white solid was filtered, washed with ice-cold acetone and dried. Yield: 38.5 g.; M.P. 199–202°.

*Analysis.*—Calcd. for $C_{19}H_{16}Cl_6N_2O_4$ (M.W. 549.08) (percent): N, 5.1. Found (percent): N, 5.2.

EXAMPLE 6

Preparation of 2,2'-methylenebis (3,4,6-trichlorophenol), di(N-butylcarbamate)

Hexachlorophene (40.7 g.) in dry acetone (250 ml.), triethylamine and butyl isocyanate (27 ml.) were brought to reaction as described in Example 1.

After agitation for 30 minutes a heavy precipitate formed. Acetone (100 ml.) was added to facilitate agitation.

After agitation for 2 hours at 60° and at room temperature for 16 hours, the solid was filtered, washed with acetone and dried. Yield: 52.2 g.; M.P. 168–170°.

It was recrystallized from ethylene dichloride (800 ml.) Yield: 43 g.; M.P. 174–175°.

*Analysis.*—Calcd. for $C_{23}H_{24}Cl_6N_2O_4$ (percent): Cl, 35.15; N, 4.63. Found (percent): Cl, 35.14; N, 4.86.

EXAMPLE 7

Liquid make-up lotion

The following ingredients were carefully mixed in a suitable mixer.

| | Parts |
|---|---|
| Veegum | 1 |
| Iron oxide micronized | 2 |
| Kaolin | 4.5 |
| TiO$_2$ | 4 |
| Sodium carboxymethylcellulose | 0.85 |
| Glycerol | 3 |
| Water | 29.15 |
| 2,2'-methylenebis-(3,4,6 - trichlorophenol), di(N-methylcarbamate) micronized | 0.5 |

Then 4 parts of sodium lauryl sulfate was added and the whole stirred thoroughly.

In place of the carbamate used in this example any of the carbamates of Examples 2 to 6, inclusive, may be used.

EXAMPLE 8

Liquid powder (A) Colloidal kaolin (100 g.) was intimately ground with distilled water (800 g.).

(B) Separately, TiO$_2$ (49.5 g.), 2,2'-methylenebis (4,6-dichlorophenol, di(N-methylcarbamate) (10 g.) and glycerine (50 g.) were thoroughly mixed.

Both of the mixtures (A and B) were combined and shaken well. The liquid powder may be colored by addition of an appropriate amount of a certified color.

In place of the carbamate used in this example, the carbamates of Examples 1 and 3 to 6, inclusive, may be used.

EXAMPLE 9

Cleansing cream

Paraffin 125/127 (20 parts) was melted; petrolatum (15 parts) was added and then mineral oil 65/75 (65 parts) was added.

TiO$_2$ (1 part) and 2,2'-methylenebis (3,4,6-trichlorophenol), di(N-allylcarbamate), micronized, 1 part was incorporated by milling, preferably with a roller mill.

In place of the carbamate used in this example any of the carbamates of Examples 1, 2, 4, 5 and 6 may be used.

EXAMPLE 10

Toothpaste

Calcium carbonate (13 g.), dicalcium phosphate dihydrate (37 g.) and 2,2'-methylenebis (3,4,6-trichlorophenol), di(N-propylcarbamate), micronized, 1 g. was premixed and then introduced into a suitable mixer, together with a solution of glycerol (30 g.), Irish moss (1 g.), water (15 g.), and saccharin (0.2 g.).

After mixing to a homogeneous paste, 3 g. of sodium laurylsulfoacetate, and a suitable flavor (0.8 g.) were added. After completion of the mixing, the paste was milled, deaerated and tubed.

In place of the carbamate used in this example, any of the carbamates of Examples 1, 2, 3, 5 and 6 may be used.

EXAMPLE 11

Tooth powder

The following ingredients were mixed in a ribbon-type mixer until homogeneous:

| | Parts |
|---|---|
| Microcrystalline aluminum hydroxide | 89 |
| Sodium N-lauroyl sarcosinate | 5 |
| Micronized 2,2' - methylenebis (3,4,6-trichlorophenol di(N-ethylcarbamate) | 2 |
| Saccharin | 0.1 |
| Flavor | 1 |

In place of the carbamate used in this example, any of the carbamates of Examples 1 to 4, inclusive, and 5, may be used.

EXAMPLE 12

Deodorant stick

Sodium stearate (16 oz.), glycerol (10 oz.) and water (20 oz.) were melted together.

2,2'-methylenebis (3,4,6-trichlorophenol), di(N-butylcarbamate), 0.5 oz., and perfume oil (3.5 oz.) were dissolved in specially denatured alcohol (150 oz.).

The carbamate solution was stirred into the molten mixture. Finally, the mass was poured into suitable molds.

In place of the carbamate used in this example, any of the carbamates of Examples 1 to 5, inclusive, may be used.

All of the compositions of Examples 7 to 12, inclusive, exhibited bacteriostatic properties, color stability and low toxicity, and in these regards were substantially the same as the above-described soaps which contain the novel compounds of this invention.

The foregoing illustrates the practice of this invention, which, however, is not to be limited thereby but is to be construed as broadly as permissible in view of the prior art and limited solely by the appended claims.

What is claimed is:

1. A compound having the formula:

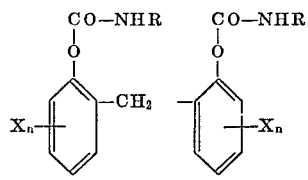

wherein R is a member selected from the group consisting of a lower alkyl radical and a lower alkenyl radical, X is chloro and $n$ is an integer from 2 to 3, provided that when $n$ is 2, the R is methyl.

2. 2,2' - methylenebis (4,6 - dichlorophenol), di(N-methylcarbamate).

3. 2,2' - methylenebis (3,4,6-trichlorophenol), di(N-methylcarbamate).

4. 2,2' - methylenebis (3,4,6-trichlorophenol), di(N-ethylcarbamate).

5. 2,2' - methylenebis (3,4,6-trichlorophenol), di(N-propylcarbamate).

6. 2,2' - methylenebis (3,4,6-trichlorophenol), di(N-butylcarbamate).

7. 2,2' - methylenebis (3,4,6-trichlorophenol), di(N-allylcarbamate).

References Cited

UNITED STATES PATENTS

| 2,777,871 | 1/1957 | Strain | 260—479 |
| 3,035,969 | 5/1962 | Hartle et al. | 260—479 |

JAMES A. PATTEN, Primary Examiner

U.S. Cl. X.R.

252—106, 107; 424—300